(No Model.)
W. T. FORBES & G. LEDER.
PROCESS OF EXTRACTING OIL.
No. 397,792. Patented Feb. 12, 1889.
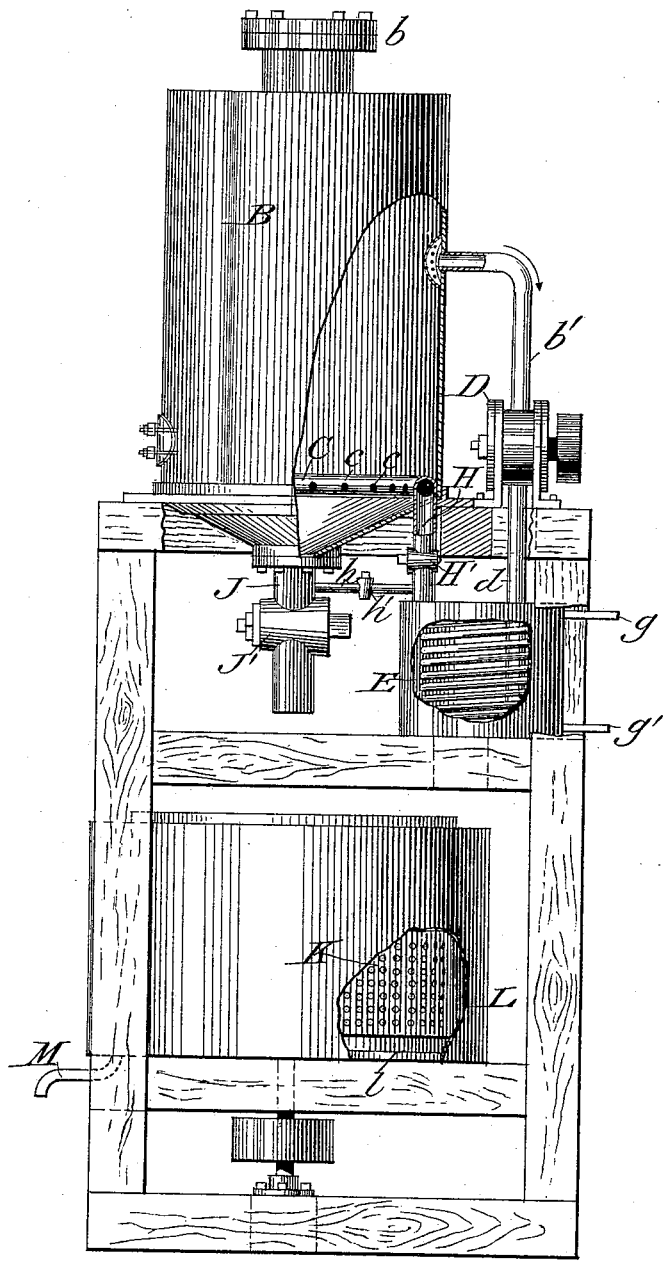
Attest:
F. H. Schott
G. Burroughs
Inventor:
W. T. Forbes & G. Leder
By W. T. E. Chandler
atty

United States Patent Office.

WALTER T. FORBES, OF ATLANTA, GEORGIA, AND GEORGE LEDER, OF DEMOPOLIS, ALABAMA.

PROCESS OF EXTRACTING OIL.

SPECIFICATION forming part of Letters Patent No. 397,792, dated February 12, 1889.

Application filed July 26, 1888. Serial No. 281,155. (No model.)

*To all whom it may concern:*

Be it known that we, WALTER T. FORBES, a citizen of the United States, residing at Atlanta, in the county of Fulton and State of Georgia, and GEORGE LEDER, a citizen of the United States, residing at Demopolis, in the county of Marengo and State of Alabama, have invented certain new and useful Improvements in Extracting Oil; and we do hereby declare the following to be a full, clear, and exact description of the invention, such as will enable others skilled in the art to which it appertains to make and use the same, reference being had to the accompanying drawing, and to letters or figures of reference marked thereon, which form a part of this specification.

Our experiments, by which we have determined the practicability of our process, have been conducted with cotton-seed as the material from which to extract the oil. We will therefore, while we believe that the process is applicable to the extraction of oil from any oil-bearing material, describe it and a preferred form of apparatus by which it may be carried into effect as applied to the working of cotton-seed as the material. Heretofore, after crushing the kernels, it has been the practice to heat them by external or direct application of heat, or both, to soften and make liquid the oil in the oil-cells, and then to express the oil in a powerful hydraulic press, the crushed seeds being placed for that purpose between mats. The effect of this pressure is to compress the mats and seeds to force out the oil, and thereby condense them, which condensation hinders the free flow of the oil.

In our process we first break up the cellular tissue and cause the oil in the cells to unite with other oil of the same kind, after which we separate the oil, all of which is free from the other elements of the seed.

The form of apparatus that is preferred by us at this time for the carrying out of our process is illustrated in side elevation in the accompanying drawing, the different parts of which are as follows:

B is a tank, closed at the top by a cover, $b$. In the bottom of the tank B is a pipe, C, bent into circular form and extending around the interior, and provided with apertures $c$, about equal in total area to that of the pipe C.

D is a pump, and E is a heater.

$b'$ is a pipe leading from the tank to the pump. $d$ is a pipe leading from the pump to the heater, and H is a pipe leading from the heater to the pipe C, with a branch, $h$, leading to the discharge-pipe J of the tank. In the pipes H, $h$, and J are the valves H′, $h'$, and J′, that should be proportioned in size to the pipes on which they are placed.

$g$ and $g'$ are the inlet and outlet pipes for steam.

It is immaterial whether the steam-pipes, or a continuation of the pipe $d$, connecting with the pipe H, is coiled in the heater, it being necessary only that one of these pipes shall connect with the coil and the other with the space that surrounds it.

K is the porous periphery of the cylinder of a centrifugal filter, and L is the casing, between which and the cylinder there is an annular space, there being also a space between the bottom of the cylinder and the bottom $l$ of the casing.

The apparatus described above is shown in a somewhat rudimental form, as it is shown simply to illustrate the different operations of which our process consists, and may be considerably varied in construction and perform its functions substantially in the manner hereinafter described.

The first operation in our process is the decomposition of the cellular tissue by heat applied through the agency of oil of the same kind as that contained in the material to be treated. In performing this operation the crushed kernels are charged into the tank through the opening in the top until it is filled nearly to the opening in the pipe $b'$, and oil from seed of the same kind is charged into the tank until it rises to a point somewhat above the pipe $b'$, filling the pipe $b'$, the pump D, the pipe $d$, the heater E, and the pipes H, C, $h$, and J, after which the plate $b$ is put on and secured with proper packing to insure a tight joint. Previous to charging the crushed kernels into the tank they may be heated to about the degree required in any approved way by the external application of heat, or, if the condition of the seeds requires it, by the direct application of steam, or by both. In charging the crushed kernels in the condition just described nearly all of the time required for the preliminary heating in the tank is saved, and the result is the same, as no change will have taken place during that preliminary heating, except the raising of the temperature of the material and softening the oil in the cells.

After the tank shall have been sealed, as above described, the pump D is put in motion, circulating the oil in the direction indicated by the arrow near the pipe $b'$, and steam is admitted into the heater E. This circulation of the oil through the pump and the heater, the oil being taken from the top and returned into the bottom of the tank, will cause a constant current of heated oil to flow upwardly through the material to be treated, and when the whole mass shall become heated to about 300° Fahrenheit the heated free oil will attack the cellular tissue, and by decomposing its integument liberate the oil in the cells, when the whole will become a mass of free oil and refuse matter. The oil that is charged into the tank with the crushed seeds, being of the same kind as the oil that it liberates from the seeds, does not change the nature of either; but on account of its identical nature it is found by experiment to liberate the oil in the cells much more quickly than when the heat is communicated through any other kind of medium.

The next and final operation is the separation of natural and added oil from the refuse matter, which operation may be performed by any device that causes the filtration of the oil; but we find the use of a centrifugal filter of the kind shown in the drawing to be efficacious, as the integument of the oil-cells is so thoroughly disintegrated by the first operation, hereinbefore described, that the second operation consists simply in separating the oil which is all free from the other elements of the mass that comes from the disintegrating-tank.

The contents of the tank may be taken out in any approved way; but we prefer to draw it through the valve J, whence it may fall by gravity, or be conveyed in any way to the separating apparatus.

Having described our invention, what we claim as new, and desire to secure by Letters Patent of the United States, is—

1. A process of extracting oil, consisting of the following operations, namely: heating the oil-bearing material in oil of the same kind as that contained in the material, constantly circulating through said material from bottom to the top, the point of disintegration of the integument of the oil-cells, and afterward separating the oil from the refuse material by filtration.

2. In a process of extracting oil, the disintegration of the integument of the oil-cells by heating the oil-bearing material in an upwardly-flowing current of heated oil from the same kind of material.

In testimony whereof we affix our signatures in presence of two witnesses.

WALTER T. FORBES.
GEORGE LEDER.

Witnesses as to W. T. Forbes:
   A. P. WOOD,
   C. E. LUCAS.

Witnesses as to George Leder:
   T. J. BRADLEY,
   B. A. MEGINNISS.